US009875235B1

(12) United States Patent
Das et al.

(10) Patent No.: US 9,875,235 B1
(45) Date of Patent: Jan. 23, 2018

(54) PROCESS FLOW DIAGRAMMING BASED ON NATURAL LANGUAGE PROCESSING

(71) Applicant: Microsoft Technology Licensing, LLC, Redmond, WA (US)

(72) Inventors: Dinesh Chanra Das, Redmond, WA (US); Unmesh Tambwekar, Redmond, WA (US); Meng Khan Seah, Sammamish, WA (US); Terence H. Lee, Sammamish, WA (US); Srinivasu Geddam, Redmond, WA (US); Vedant Dharnidharka, Kolkata (IN); Archit Shukla, Hyderabad (IN); Vivekanand Pandey, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/285,670

(22) Filed: Oct. 5, 2016

(51) Int. Cl.
*G06F 17/27* (2006.01)

(52) U.S. Cl.
CPC ........ *G06F 17/2785* (2013.01); *G06F 17/274* (2013.01); *G06F 17/2705* (2013.01)

(58) Field of Classification Search
CPC ...................................................... G06F 17/02
USPC ........................... 704/1, 9, 10, 257, 270–275
See application file for complete search history.

(56) References Cited

U.S. PATENT DOCUMENTS

| | | | |
|---|---|---|---|
| 5,528,491 A | 6/1996 | Kuno et al. | |
| 5,995,918 A * | 11/1999 | Kendall | G06F 17/271 379/88.01 |
| 6,625,608 B1 | 9/2003 | Watanabe | |
| 8,050,907 B2 | 11/2011 | Baisley et al. | |
| 8,862,458 B2 | 10/2014 | Freising et al. | |
| 8,949,773 B2 | 2/2015 | Paradkar et al. | |
| 8,996,357 B2 | 3/2015 | Takayama | |

(Continued)

FOREIGN PATENT DOCUMENTS

WO   2015067968 A1   5/2015

OTHER PUBLICATIONS

Sinha, et al., "A linguistic analysis engine for natural language use case description and its application to dependability analysis in industrial use cases", In Proceedings of IEEE/IFIP International Conference on Dependable Systems & Networks, Jun. 29, 2009, pp. 327-336.

(Continued)

*Primary Examiner* — Jesse Pullias

(57) ABSTRACT

Non-limiting examples of the present disclosure describe natural language translation capabilities that enable automated process flow diagram generation from received input. Input may be received through an application for automated generation of a process flow diagram. The received input may be provided to a natural language processing component of a language understanding intelligence service. A data object, received from the natural language processing component, may be accessed. The data object provides data for creation of a process flow diagram based on the received input. In examples, the data object is generated based on natural language processing by the natural language processing component and at least one user defined grammar rule, provided by the application, for converting the received input to one or more process flow steps. The process flow diagram may be presented within the application. Other examples are also described such as reverse engineering an existing process flow diagram.

20 Claims, 10 Drawing Sheets

(56) References Cited

U.S. PATENT DOCUMENTS

| | | |
|---|---|---|
| 9,280,537 B2 | 3/2016 | Trivi et al. |
| 2002/0007483 A1 | 1/2002 | Lopez |
| 2004/0122654 A1* | 6/2004 | Moore ................ G06F 17/2881 704/4 |
| 2005/0033583 A1 | 2/2005 | Bergeron et al. |
| 2005/0091093 A1 | 4/2005 | Bhaskaran et al. |
| 2005/0234708 A1* | 10/2005 | Meehan .................... G06F 8/20 704/9 |
| 2009/0119095 A1 | 5/2009 | Beggelman et al. |
| 2010/0325491 A1 | 12/2010 | Kumanan et al. |
| 2013/0332812 A1 | 12/2013 | Houston |
| 2015/0339269 A1 | 11/2015 | Konchitsky et al. |

\* cited by examiner

400

420

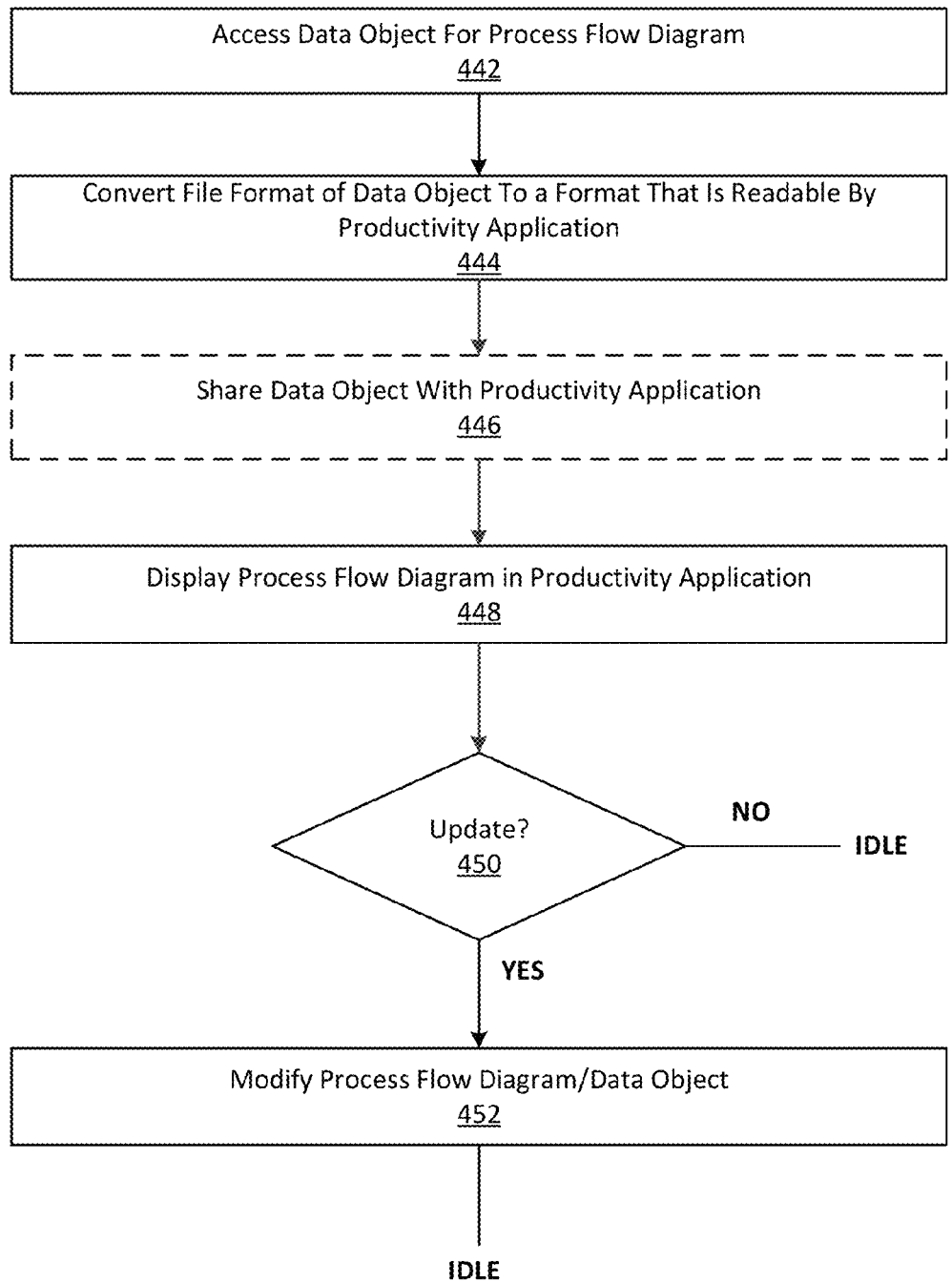

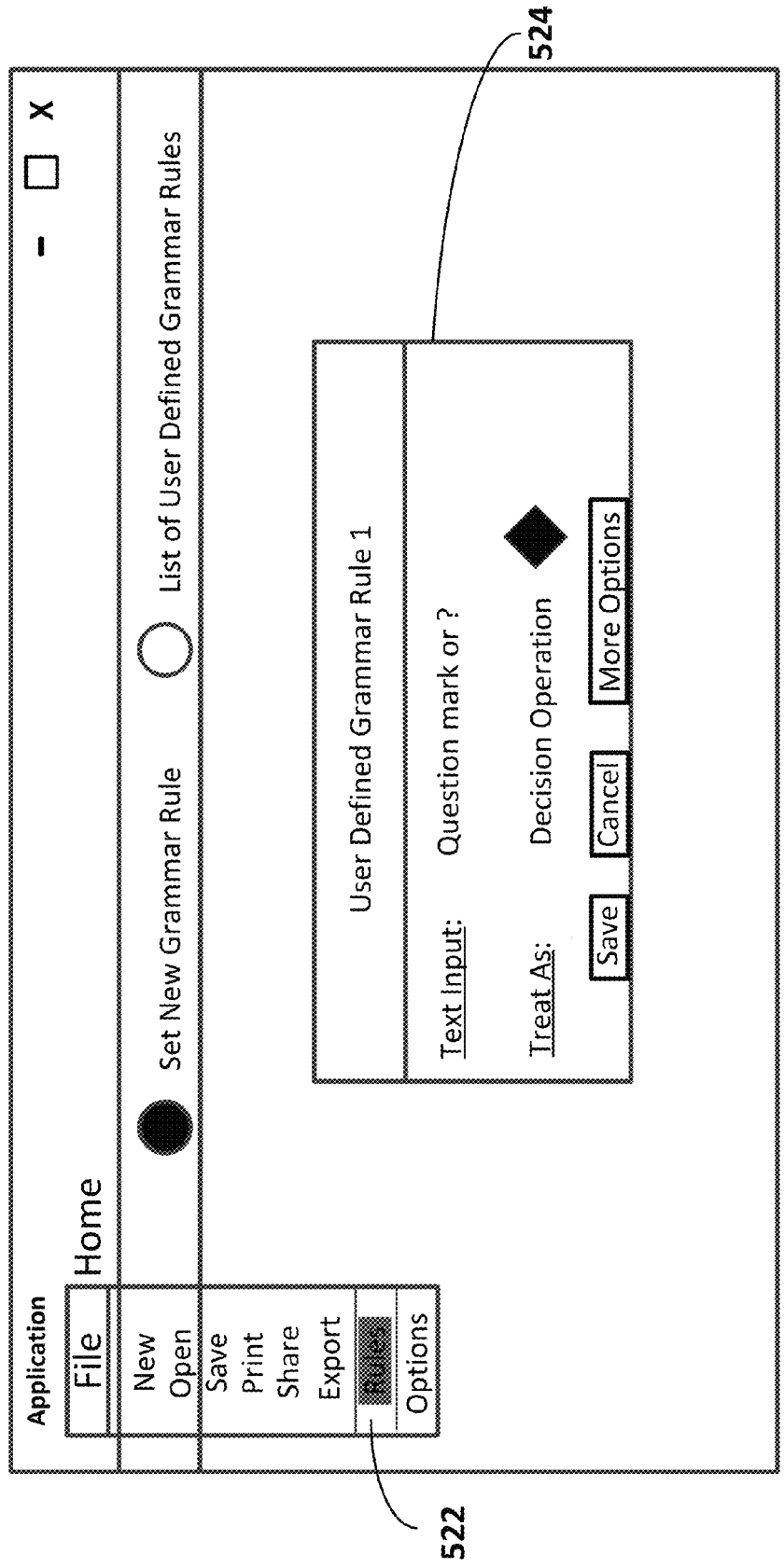

600

PROCESS FLOW DIAGRAMMING BASED ON NATURAL LANGUAGE PROCESSING

BACKGROUND

Generation of a process flow diagram can be a tedious task for a user. Users typically have to select particular process flow components, define every connection, decision, etc. This can be problematic from not only a time efficiency standpoint but also hinder productivity of a user. Moreover, many process flow diagrams are created for particular business purposes including compliance with policy and regulations. This can present additional challenges for a user when working with applications/services that are not tailored to contemplate such concerns.

As such, examples of the present application are directed to the general technical environment related to management of automated generation of a process flow diagram from received input, among other examples.

SUMMARY

Non-limiting examples of the present disclosure describe natural language translation capabilities that enable automated process flow diagram generation from received input. An input may be received through an application for automated generation of a process flow diagram. The received input may be provided to a natural language processing component of a language understanding intelligence service. A data object, received from the natural language processing component, may be accessed. The data object provides data for creation of a process flow diagram based on the received input. In examples, the data object is generated based on natural language processing by the natural language processing component and at least one user defined grammar rule, provided by the application, for converting the received input to one or more process flow steps. The process flow diagram may be presented within the application. Other examples are also described such as reverse engineering an existing process flow diagram.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4C is an exemplary method related to manipulation of a data object used for generation of a process flow diagram with which aspects of the present disclosure may be practiced.

FIGS. 5A and 5B are exemplary processing device views of a user interface of an application configured for automated generation of a process flow diagram with which aspects of the present disclosure may be practiced.

DETAILED DESCRIPTION

Figure 1:
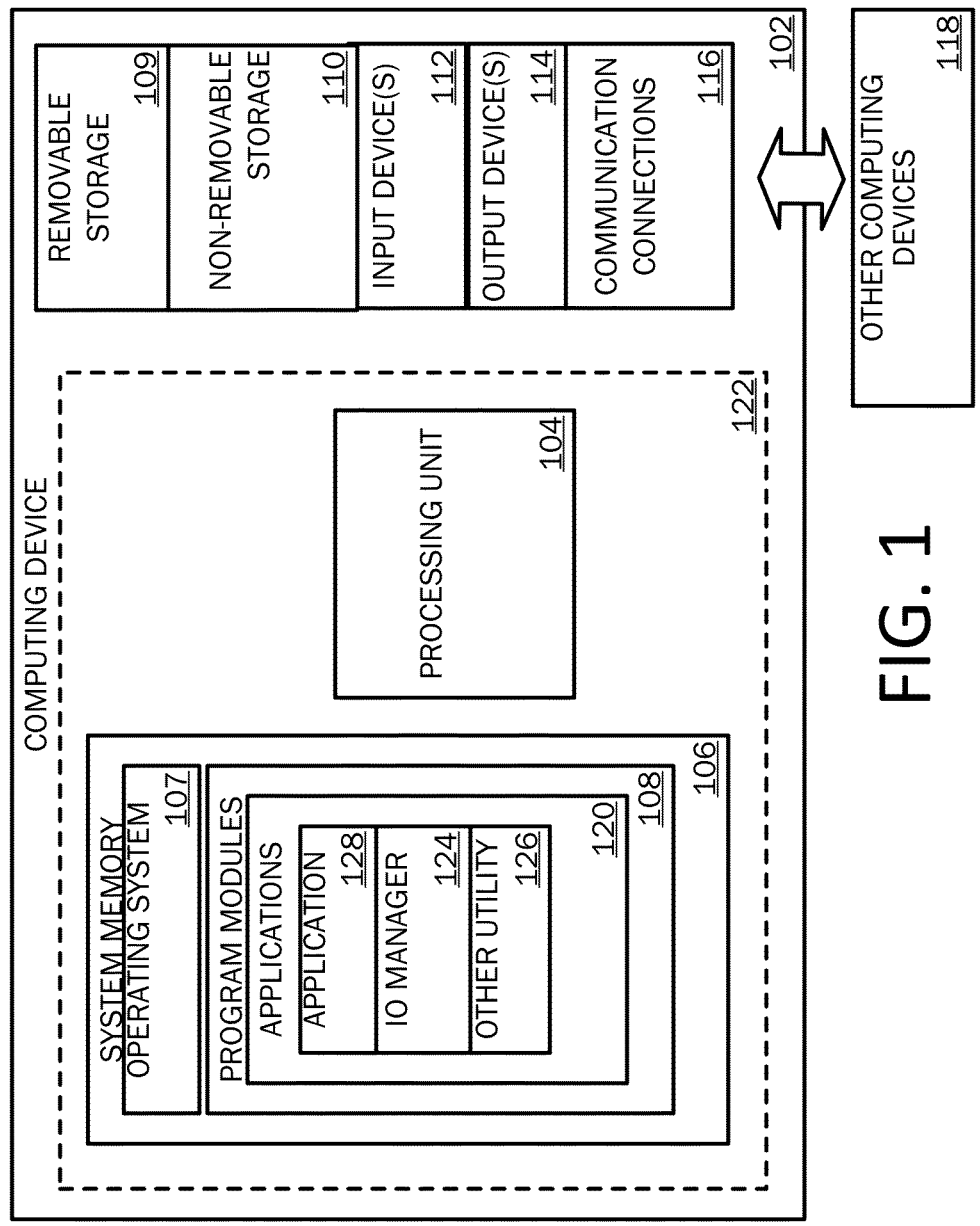
FIG. 1 is a block diagram illustrating an example of a computing device with which aspects of the present disclosure may be practiced.

Examples herein describe natural language translation capabilities that enable automated process flow diagram generation from received input. An exemplary application configured for automated process flow generation is described that comprises a user interface for management of process flow diagram creation. Examples of an exemplary user interface are shown in at least FIGS. 5A and 5B. One skilled in the art should recognize that a user interface may be modified from the examples shown (e.g. in FIGS. 5A and 5B) without departing from the spirit of the present disclosure. In examples, the exemplary user interface may be configured to provide a user with an ability to enter/modify input and simultaneously view an automated generation of a process flow diagram based on the input. For instance, the user interface may comprise a display that simultaneously displays received input in a first pane of the user interface and displays a generated process flow diagram in a second pane of the user interface.

In examples, an exemplary application configured for automated generation of a process flow diagram may be further configured to enable management of user-defined grammar rules that can be utilized to assist the automated generation of a process flow diagram from received input. In examples, a user-defined grammar rule may be specific to conversion of input into one or more process flow steps. For instance, a user interface of the exemplary application may be configured to enable a user to create user-defined grammar rules that can be utilized to translate a received input into process flow steps. In further examples, the user interface may also be configured to enable a user to manage user-defined grammar rules that may be applied for natural language processing.

An exemplary application configured for automated generation of a process flow diagram may interface with a language understanding intelligence service to enable natural language processing of a received input. A language understanding intelligence service is a service that provides natural language processing, which may be utilized to provide a contextual understanding of a received input. In one instance, the language understanding intelligence service may be a separate service that interfaces with the application via a connection over a distributed network. An exemplary language understanding intelligence service may comprise a natural language processing component that is configured to execute natural language processing of received input. In one example, systems and methods for natural language processing may comprise both an exemplary application and the language understanding intelligence service. In an alternative example, an exemplary application may be a stand-alone application that comprises a natural language processing component, for example, provided by the language understanding intelligence service. In such an instance, a natural language processing component may be updated periodically based on training, testing and/or machine learning.

In some examples, the application configured for automated generation of a process flow diagram may pass a received input to the language understanding intelligence service to analyze the received input. A process flow diagram may be created from an exemplary data object that may be generated either by the application or a language understanding intelligence service (that provides the data object to the application). An exemplary data object may be data that is used to generate a process flow diagram. In one instance, the data object is generated in a language-independent file format such as a JavaScript Object Notation (JSON). However, in other examples, format of an exemplary data object may vary.

In one example, the natural language processing component of the language understanding intelligence service may generate a data object that is used to create a process flow diagram. An exemplary application configured for automated generation of a process flow diagram may utilize the data object to generate (and display) a process flow diagram for received input. In another example, the natural language processing component may provide a result of executing natural language processing. The exemplary application may utilize a natural language processing result to generate the data object that is used for creation of a process flow diagram. In any instance, the exemplary application uses the data object to create and display a process flow diagram.

Natural language processing executed for the received input may comprise executing a language understanding model to process the received input. In examples, the user-defined grammar rules may be contemplated by the language understanding model to assist with translating the received input into one or more process flow steps. Traditionally, language understanding models may not be configured to convert text input into process flow steps. In examples described herein, a language understanding model can be adapted for the purpose of generating process flow steps from received input. A language understanding model may be trained to identify input, where the user-defined grammar rules can be used by the model to better translate the received input into one or more process flow steps. For instance, a user-defined grammar rule may help a model better identify whether an input should be a process flow step or a decision operation. Further, the ability to create user-defined grammar rules enables users to set rules in accordance with standards and regulations, for example, when process flow diagrams are to be created for business purposes. User-defined grammar rules may also be utilized to help a model become familiar with user vocabulary and/or writing style of a user. This can enable a language understanding to improve automation for generation of a process flow diagram from received input.

In further examples, an exemplary application configured for automated process flow generation may be configured to interface with any of a plurality of productivity applications, for example, to enable a productivity application to generate and display a process flow diagram. A productivity application is any application dedicated to producing information such as documents, presentations, worksheets, databases, charts, graphs, digital images, and process flow charts, among other examples. An exemplary process flow diagram may be generated from a data object as described above. In many cases, the format of that data object may not be usable by a particular productivity application to create and display the process flow diagram. In such cases, the exemplary application configured for automated process flow generation may be configured to convert data of the data object and/or a file format of the data object so that the data object is readable by the productivity application to display a process flow diagram. For instance, an exemplary application can create multiple formats of a data object that can be accessed by particular productivity applications. In alternative examples, the exemplary application may share or export a data object that can be converted by a productivity application.

One skilled in the art that understands the present disclosure should recognize that an exemplary application can be configured/modified to include additional features related to the creation and management of exemplary user-defined grammar rules, process flow diagram generation as well as an interaction with a natural language processing component of a language understanding intelligence service, among other examples. In further examples, an exemplary application configured for automated generation of a process flow diagram may be presented as a web service that can be accessed via a network connection.

In additional examples, the exemplary application may further be configured to execute reverse engineering processing of an existing process flow diagram. Reverse engineering processing enables the exemplary application to provide a user with a textual representation of an existing process flow diagram that a user can utilize to easily and efficiently modify an existing process flow diagram, for example, by entering input into a user interface of the exemplary application. Description for reverse engineering processing is provided in reference to FIG. 5A and described in the description of processing device view 500.

Accordingly, the present disclosure provides a plurality of technical advantages including but not limited to: customized user interface for automated generation of a process flow diagram from received input, ability to generate and manage user-defined grammar rules to assist with generation of a process flow diagram, ability to adapt natural language processing components for process flow generation, ability to forward engineer input to automatically create a process flow diagram, ability to reverse engineer an existing process flow diagram, more efficient operation of processing devices (e.g., saving computing cycles/computing resources) for creation of a process flow diagram from received input, ability to translate data objects into specific formats for productivity applications, improved user interaction with one or more processing devices when creating flow chart diagrams and extensibility to integrate a plurality of services across a distributed system to improve generation and management of data for process flow diagrams, among other examples.

Figure 2A:
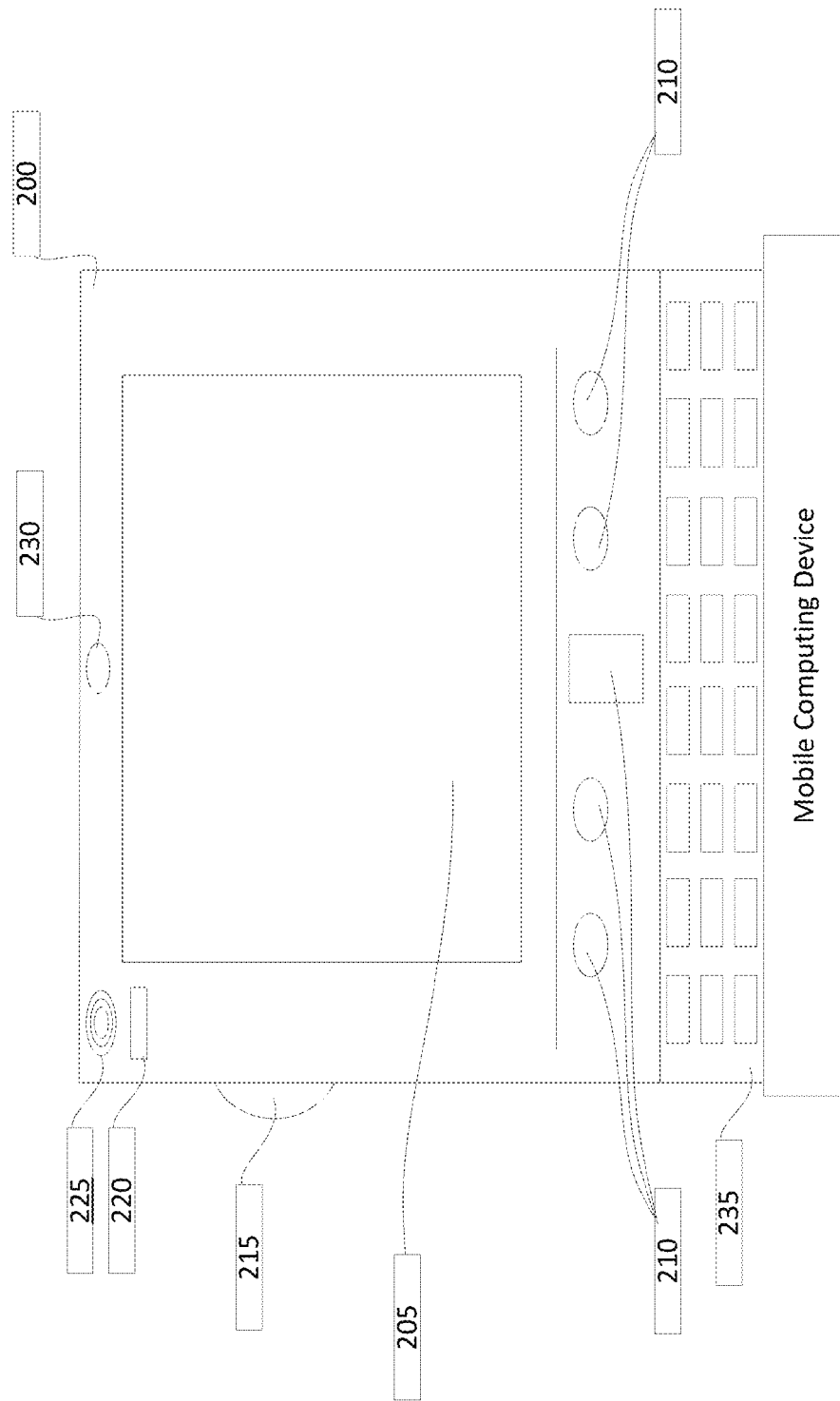
FIGS. 2A and 2B are simplified block diagrams of a mobile computing device with which aspects of the present disclosure may be practiced.
Figure 2B:
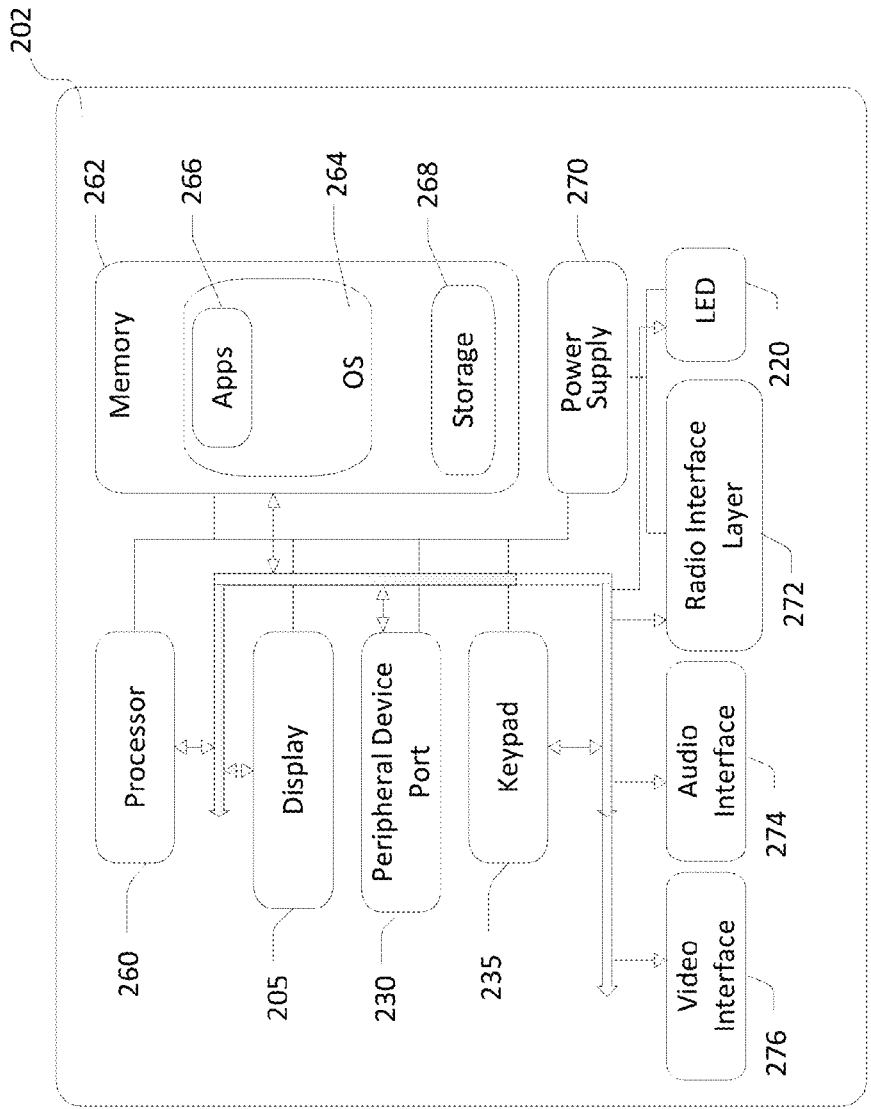
Figure 3:
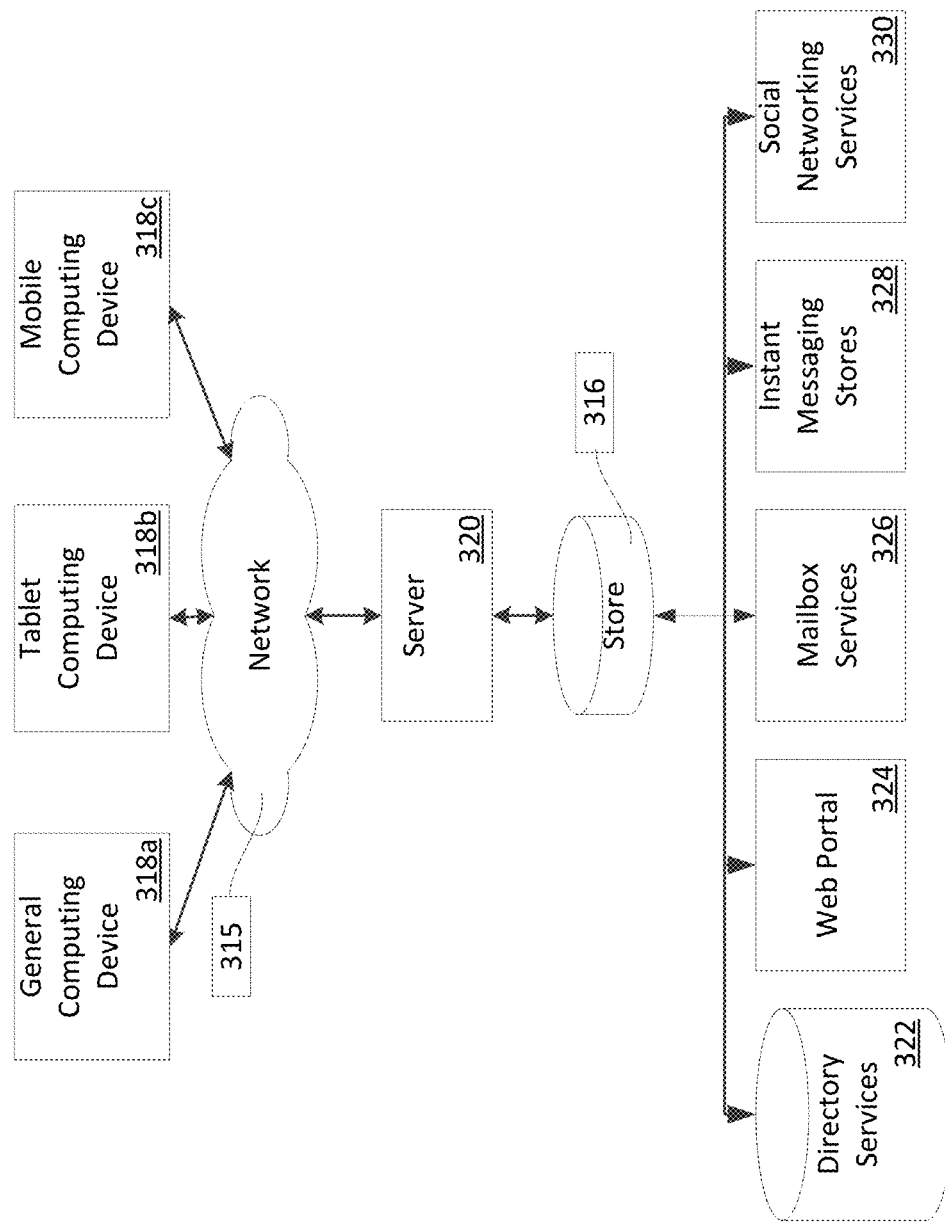
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. Among other examples, computing device 102 may be an exemplary computing device configured for process flow diagram generation and management. In examples, computing device 102 may be configured for defining rules that enable either an application for automated generation of a process flow diagram or an exemplary language understanding intelligence service to: generate process flow diagrams from received input, generate a data object for a process flow diagram and/or convert a data object for a process flow diagram to a format that is readable by a productivity application, among other examples described herein. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device configured for process flow diagram generation and management. In examples, mobile computing device 200 may be configured for defining rules that enable either an application for automated generation of a process flow diagram or an exemplary language understanding intelligence service to: generate process flow diagrams from received input, generate a data object for a process flow diagram and/or convert a data object for a process flow diagram to a format that is readable by a productivity application, among other examples described herein. Application command control may be provided for applications executing on a computing device such as mobile computing device 200. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device (e.g. system 202) described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225 (as described in the description of mobile computing device 200). In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225 (shown in FIG. 2A), the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system configured for process flow diagram generation and management. In examples, a system of FIG. 3 may be configured for defining rules that enable either an application for automated generation of a process flow diagram or an exemplary language understanding intelligence service to: generate process flow diagrams from received input, generate a data object for a process flow diagram and/or convert a data object for a process flow diagram to a format that is readable by a productivity application, among other examples described herein. Target data accessed, interacted with, or edited in association with programming modules 108 and/or applications 120 and storage/memory (described in FIG. 1) may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and a client node may be implemented for connecting to network 315. Examples of a client node comprise but are not limited to: a computing device 102 embodied in a personal computer, a tablet computing device, and/or by a mobile computing device 200 (e.g., mobile processing device). As an example, a client node may connect to the network 315 using a wireless network connection (e.g. WiFi connection, Bluetooth, etc.). However, examples described herein may also extend to connecting to network 315 via a hardwire connection. Any of these examples of the client computing device 102 or 200 may obtain content from the store 316.

Figure 4A:
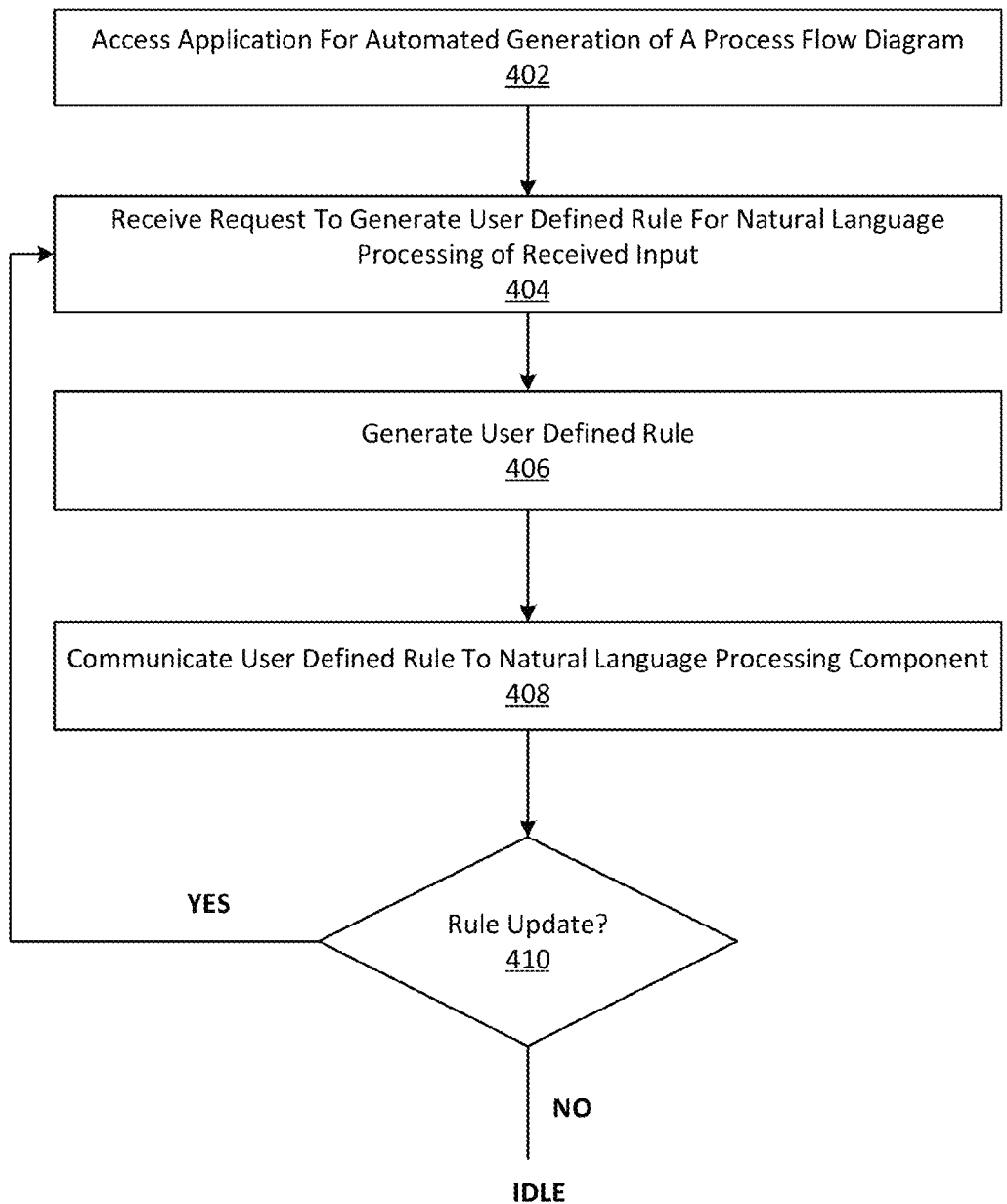
FIG. 4A is an exemplary method related to generation of a user-defined grammar rule with which aspects of the present disclosure may be practiced.

FIG. 4A is an exemplary method 400 related to generation of a user-defined grammar rule with which aspects of the present disclosure may be practiced. As an example, method 400 may be executed by an exemplary processing device and/or system such as those shown in FIGS. 1-3. In examples, method 400 may execute on a device comprising at least one processor configured to store and execute operations, programs or instructions. Operations performed in method 400 may correspond to operations executed by a system and/or service that execute computer programs, application programming interfaces (APIs), neural networks or machine-learning processing, among other examples. As an example, processing operations executed in method 400 may be performed by one or more hardware components. In another example, processing operations executed in method 400 may be performed by one or more software components. In some examples, processing operations described in method 400 may be executed by one or more applications/services associated with a web service that has access to a plurality of application/services, devices, knowledge resources, etc. Processing operations described in method 400 may be implemented by one or more components connected over a distributed network, for example, as described in system 600 (of FIG. 6).

Method 400 begins at operation 402, where an application configured for automated generation of a process flow diagram is accessed. Access (operation 402) to an exemplary application may be triggered by actions including but not limited to: a user request to launch the application, launching of an exemplary data object for generation of a process flow diagram and upon startup of a computing device. An exemplary application configured for automated process flow generation is disclosed that comprises a user interface for management of process flow diagram creation. Examples of an exemplary user interface are shown in at least FIGS. 5A and 5B. One skilled in the art should recognize that a user interface may be modified from the examples shown (e.g. in FIGS. 5A and 5B) without departing from the spirit of the present disclosure.

In examples, the exemplary user interface may be configured to provide a user with an ability to enter/modify input and simultaneously view an automated generation of a process flow diagram based on the input. For instance, the user interface may comprise a display that simultaneously displays received input in a first pane of the user interface and displays a generated process flow diagram in a second pane of the user interface, for example as shown in processing device view 500 (of FIG. 5A). In examples, an exemplary application for automated process flow generation may be further configured to enable management of user-defined grammar rules that can be utilized to assist the automated generation of a process flow diagram from received input. A user-defined grammar rule may be specific to conversion of input into one or more process flow steps. For instance, a user interface of the exemplary application may be configured to enable a user to create user-defined grammar rules that can be utilized to translate a received input into process flow steps, for example, as shown in processing device view 520 (of FIG. 5B). In further examples, the user interface may also be configured to enable a user to manage user-defined grammar rules that may be applied for natural language processing for example, as shown in processing device view 520 (of FIG. 5B).

Flow may proceed to operation 404, where a request is received to generate a user-defined rule. For instance, a user may navigate a user interface to select a user interface feature to create a user-defined grammar rule. A user-defined grammar rule may be specific to conversion of input into one or more process flow steps. For instance, a user interface of the exemplary application may be configured to enable a user to create user-defined grammar rules that can be utilized to translate a received input into process flow steps, for example, as shown in processing device view 520 (of FIG. 5B).

With user-defined grammar rules, users can use multiple languages of their choice, both written and speech inputs. An editor/translator may have machine learning capability to apply to words identified in the user-defined grammar rules. In other examples, existing process maps could be converted into the user's natural language to allow collaboration with users not familiar with existing the process mapping software, among other examples. Further, a user-defined grammar rule may help a language understanding model to better identify whether an input should be a process flow step or a decision operation. Moreover, the ability to create user-defined grammar rules enables users to set rules in accordance with standards and regulations, for example, when process flow diagrams are to be created for business purposes. User-defined grammar rules may also be utilized to help a language understanding model become familiar with user vocabulary and/or writing style of a user. This can enable a language understanding to improve automation for generation of a process flow diagram from received input.

A request (received in operation 404) may comprise entered information associated with setting a rule including one or more data fields comprising but not limited to: fields related to identifying types of input, fields related to determining how to treat specific types of input, similar words to look for, control options, user specific data, device specific data, language settings, applicability of rule, links to specific content, and standards/regulations associated with the rule, among other examples. One skilled in the art understanding the present disclosure should recognize that fields related setting of a user-defined grammar rule may vary and can include any data that may be useful in converting input to one or more process flow steps. It follows, that data associated with a request may vary.

At operation 406, a user-defined grammar rule may be generated based on the request (received at operation 404). An exemplary application configured for automated generation of a process flow diagram may save a generated rule. Users, through a user interface of an exemplary application may have access to a listing of generated rules and control options for managing existing user-defined grammar rules. In one example, a user may have control over selecting which rules are ultimately applied when processing a received input.

Flow may proceed to operation 408, where a user-defined grammar rule may be communicated to a natural language processing component. An exemplary application configured for automated process flow generation may interface with a language understanding intelligence service to enable natural language processing of a received input. A language understanding intelligence service is a service that provides natural language processing, which may be utilized to provide a contextual understanding of a received input. As identified above, a user-defined grammar rule may be applied during natural language processing of a received input. An exemplary language understanding intelligence service may comprise a natural language processing component that is configured to execute natural language processing of received input. In one example, systems and methods for natural language processing may comprise both an exemplary application for automated process flow generation and the language understanding intelligence service. In an alternative example, an exemplary application may be a stand-alone application that comprises a natural language processing component, for example, provided by the language understanding intelligence service. In such an instance, a natural language processing component may be updated periodically based on training, testing and/or machine learning.

Flow may proceed to decision operation 410, where it is determined whether a rule update occurs. Operation 410 may determine that a rule update occurs when a user provides input to make a change to an existing rule, creates a new rule, deletes a rule, etc. If a rule update occurs, flow branches YES and returns back to operation 404, where a request is received for generating or modifying a rule. If no rule update occurs, flow branches NO and method 400 remains idle until further rule configuration is detected.

Figure 4B:
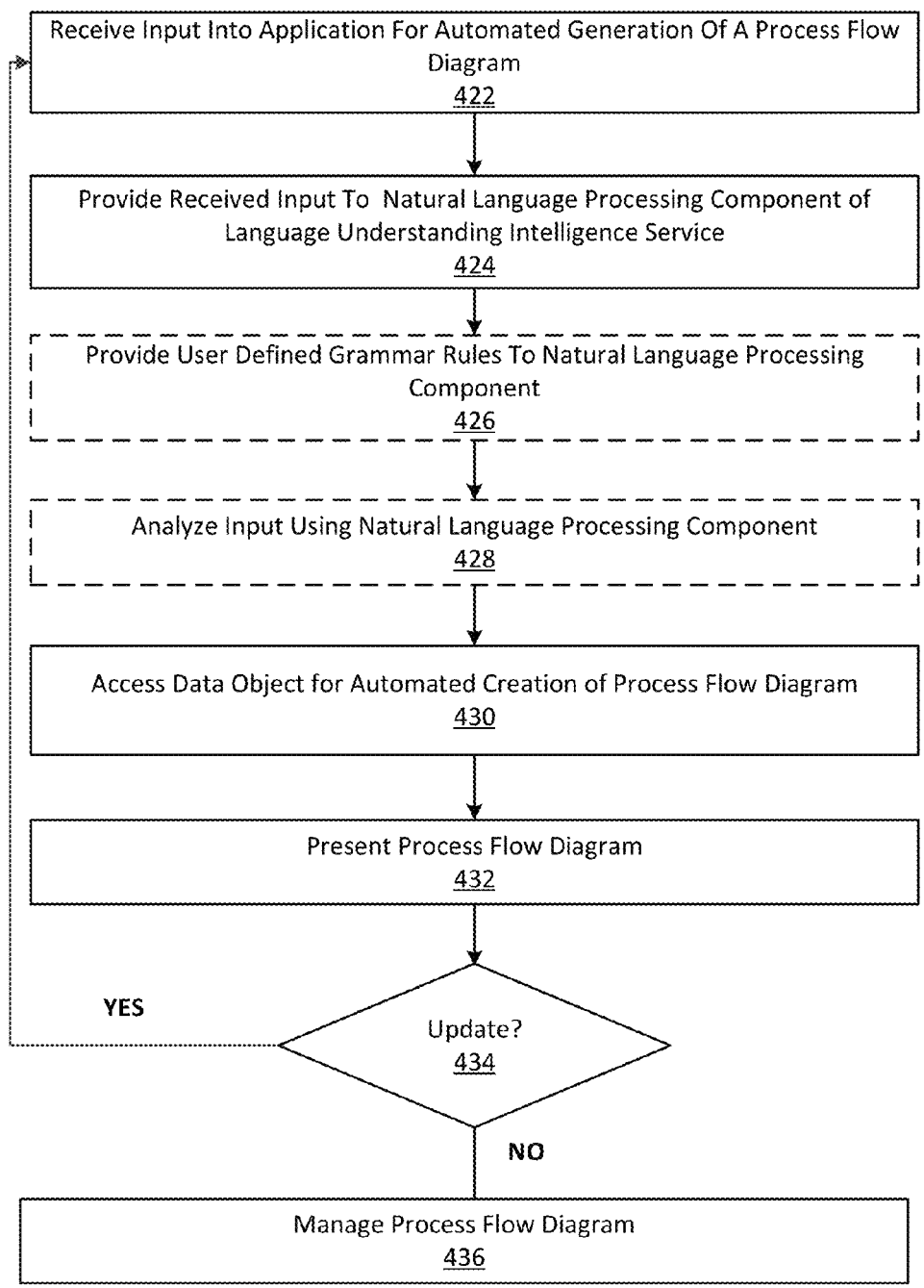
FIG. 4B is an exemplary method related to automated generation of a process flow diagram from received input with which aspects of the present disclosure may be practiced.

FIG. 4B is an exemplary method 420 related to automated generation of a process flow diagram from received input with which aspects of the present disclosure may be practiced. As an example, method 420 may be executed by an exemplary processing device and/or system such as those shown in FIGS. 1-3. In examples, method 420 may execute on a device comprising at least one processor configured to store and execute operations, programs or instructions. Operations performed in method 420 may correspond to operations executed by a system and/or service that execute computer programs, application programming interfaces (APIs), neural networks or machine-learning processing, among other examples. As an example, processing operations executed in method 420 may be performed by one or more hardware components. In another example, processing operations executed in method 420 may be performed by one or more software components. In some examples, processing operations described in method 420 may be executed by one or more applications/services associated with a web service that has access to a plurality of applications/services, devices, knowledge resources, etc. Processing operations described in method 420 may be implemented by one or more components connected over a distributed network, for example, as described in system 600 (of FIG. 6).

Method 420 begins at operation 422, where input is received into an application configured for automated generation of a process flow diagram. Examples of an application configured for automated generation of a process flow diagram have been described in the foregoing. Example processing device views of an application configured for automated generation of a process flow diagram are shown in at least FIGS. 5A and 5B. An exemplary application may be configured to receive (operation 422) input in any form including but not limited to: text input, handwritten input and spoken input. For spoken input, an exemplary application (or component of an exemplary language understanding intelligence service interfacing with the exemplary application) may convert an utterance to text for further processing. Such processing is known to one skilled in the field of art.

Figure 5A:
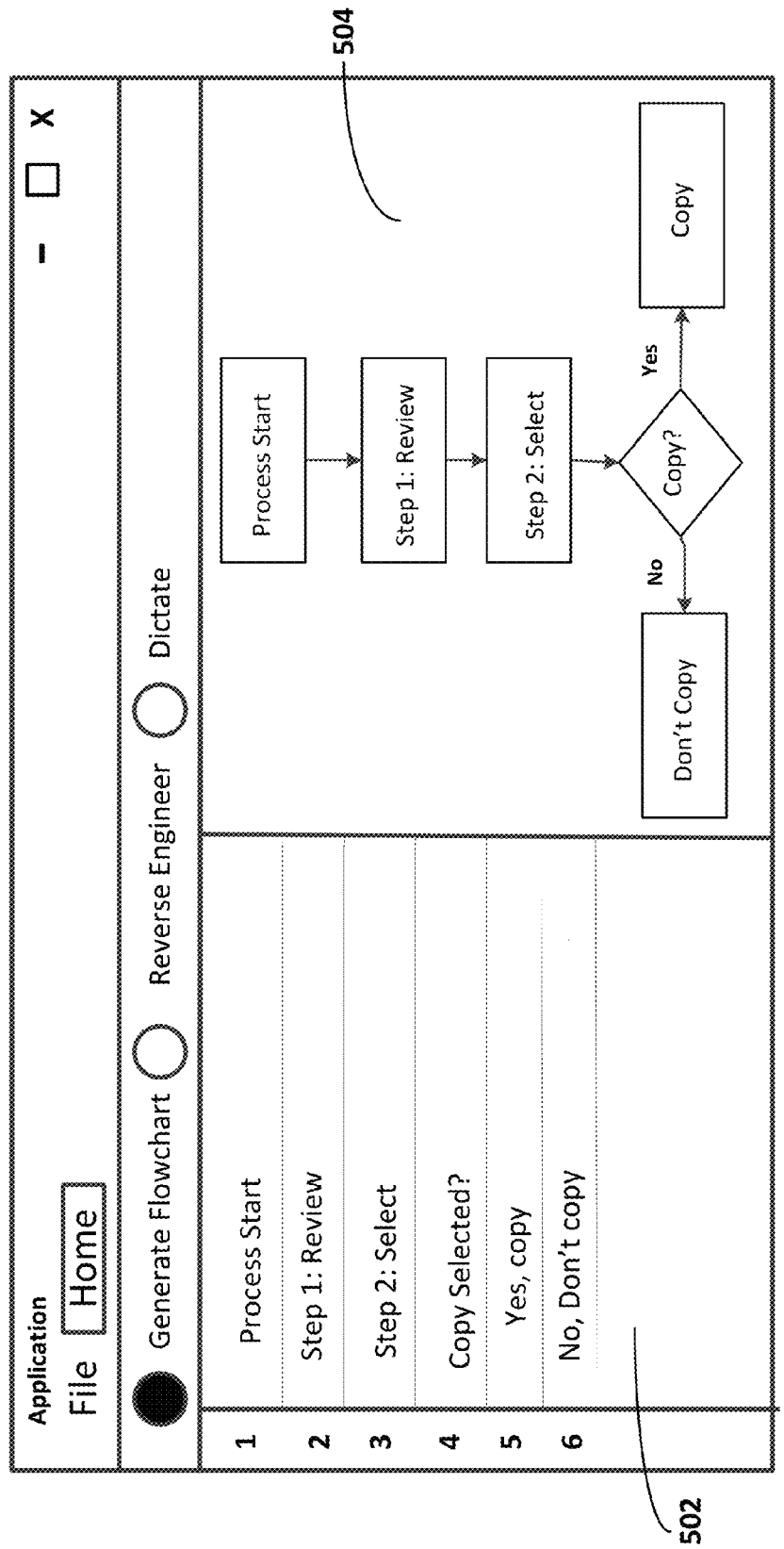

In one example, operation 422 may comprise receiving input through a user interface of the exemplary application, for example, in a pane configured for receiving input and displaying received input (e.g. left pane shown in processing device view 500 of FIG. 5A). Results of processing the received input to generate a process flow diagram may be shown concurrently in a pane configured for display of a process flow diagram (e.g. right pane shown in processing device view 500 of FIG. 5A). In capturing input, the exemplary application may be configured to add line numbers, spelling highlighting and correction abilities. The exemplary application is configured to separate input into individual sentences (if not already entered in sentence form) or recognize input entered into specific fields of a user interface, for example, as individual sentences. In one example, an exemplary application may process a received input, modify the received input and then pass the modified input to a natural language processing component. In another example, the exemplary application may manipulate received input after results have been provided from a natural language processing component. For speech to textual representation, intelligent personal assistant services, among other knowledge resources, may be leveraged to assist with speech to text conversion.

Flow may proceed to operation 424, where the received input may be provided to a natural language processing component of a language understanding intelligence service. An exemplary natural language processing component has been previously described. In one example, operation 424 may comprise accessing a natural language processing component of an exemplary language understanding intelligence service that is separate from an exemplary application configured for automated generation of a process flow diagram. For instance, an exemplary application may interface with a web service that provides natural language processing capabilities. As described in some alternative examples, the natural language processing component may be a component of the exemplary application. In such an instance, operation 424 may comprise providing the received input to the natural language processing component for natural language processing (without requiring a network connection).

Flow of method 400 may proceed to operation 426 in one of the following examples: when the natural language processing component is a component of a separate language understanding intelligence service (e.g. web service) and/or a system comprises both an exemplary application configured for automated generation of a process flow diagram and an exemplary language understanding intelligence service. At operation 426, user-defined grammar rules are provided to the natural language processing component. As identified above, user-defined grammar rules can be utilized during natural language processing to assist in translating a received input into process flow steps.

In instances where the language processing component is part of an exemplary application and/or the language understanding intelligence service is part of a system, flow of method 400 may proceed to operation 428, where the input is analyzed using the natural language processing component. Analyzing (operation 428) of the received input may comprise parsing text of the received input using the natural language processing component. Operation 428 may further comprise evaluating the text of the received input using a language understanding model that contemplates the at least one user defined grammar rule. In one example, the language processing component may employ machine learning operations or a neural network to develop confidence scores for determining how to interpret specific input. In doing so, the user-defined grammar rules can affect confidence scores related to how input may be converted to processor flow steps, decisions, connectors, etc. Further, an exemplary language understanding model may be trained using the user-defined grammar rules, among other data known in the art for training and building a language understanding model. Operation 428 may further comprise generating a result from evaluation of text input based on the natural language processing. In one example, the result may be an exemplary data object. An exemplary data object may be data that is used to generate a process flow diagram. In one instance, the data object is generated in a language-independent file format such as a JavaScript Object Notation (JSON). However, in other examples, format of an exemplary data object may vary. Processing operations related to processing a received input are now further described.

In one example, textual input is passed to the natural language processing component through a parser channel for processing the input text. An exemplary parsing channel interfaces with a natural language processing component to enable communication with an exemplary application. The natural language processing component may apply parsing operations for the received input to identify the patterns in the sentences and tag them as specific types of sentences so that specific shapes can be used while generating a flow chart using any type of diagramming tool. An exemplary natural language component may be configured to determine an intent of a given sentence of the received input. A given sentence can fall under various types of intents which may include normal sentence, a question form of sentence, a positive intent which is linked to a question, a negative intent which is again linked to a question, a 'go to' kind of sentence which acts as a connector from one sentence to an arbitrary sentence. Intents are identified based on the given grammar patterns. As an example, a grammar pattern for the question type of sentence may generally have following key words like 'is', 'has', 'have', 'does', 'do', 'if' etc. and optionally ending with a question mark symbol. The user-defined grammar rules may be applied to assist in determining a most appropriate intent. As an example an API may be applied that enables the exemplary application to provide a natural language processing component with the user-defined grammar rules to assist with categorization of intents. When a given sentence is passed to the natural language processing component, the sentence is matched against the grammar patterns, and tagged with possible intents. Each sentence can be validated against the predefined intents to see if the sentence is falling in any of the intent categories and tags the sentence with various probable intents with ranking. In one example, the sentence with highest intent ranking will be identified as type of that intent based sentence. Parsing operations further comprise emitting the intent tags for each of the sentences, for example, by identifying intents of each sentence within a generated data object.

An exemplary data object generated by a natural language processing component may comprise an output that includes intents for sentences of the received input and their corresponding ranking. Typically based on the utterances training the natural language processing component may be configured to identifying ranking patterns and return the highest ranking, which it thinks is the closest match. This output may be specific to a single sentence.

Flow may proceed to operation 430, where an exemplary data object is accessed. As described above, a data object may be configured to provide data for creation of a process flow diagram based on the received input. In examples, the data object may be received from an exemplary natural language processing component, for example, through the parsing channel. In examples, the data object being accessed (operation 430) may be generated based on natural language processing by the natural language processing component and at least one user defined grammar rule, provided by the application, for converting the received input to one or more process flow steps. The user-defined grammar rules can be used to adapt the data object to be tailored for creation of a process flow diagram, for example by determining the most appropriate intents for individual sentences of the received input.

As identified in the description of method 400, natural language processing may apply words identified in the user-defined grammar rules to generate process flow components for a process flow diagram. In other examples, existing process maps could be converted into the user's natural language to allow collaboration with users not familiar with existing the process mapping software, among other examples. Further, a user-defined grammar rule may help a language understanding model to better identify whether an input should be a process flow step or a decision operation. Moreover, the ability to create user-defined grammar rules enable users to set rules in accordance with standards and regulations, for example, when process flow diagrams are to be created for business purposes. User-defined grammar rules may also be utilized to help a language understanding model become familiar with user vocabulary and/or writing style of a user. This can enable a language understanding to improve automation for generation of a process flow diagram from received input.

The exemplary application may receive the data object (e.g. raw form JSON) and refine the data object to create a modified data object that can be used to generated the flow chart. In this processing, based on the intents identified earlier, an exemplary application is configured to define an intent as various components for process flow diagramming (e.g. process box, decision, start, end etc., and connections between various process shapes). A modified data object (e.g. JSON object) may be tailored for a targeted diagramming tool that is used to create the diagram. Each of the diagram tools have their own schema for data objects. The logic of refinement of raw JSON object to a target JSON that can be customized based on what type of drawing tool is to be used for viewing the process flow diagram.

Flow may proceed to operation 432, where the process flow diagram may be presented within the application. As an example, operation 432 may comprise creating a representation of the process flow diagram from the accessed data object (e.g. modified data object). Operation 432 may utilize a component of an application or any of first-party services, second-party services or third-party services to generate a process flow diagram for presentation. Once the refined data object is created (e.g. for a target drawing tool), the data object is applied to the target tool by calling the methods supported by the drawing tool. Each tool has its own form of supporting input text for drawing, hence such processing operations may be treated as custom code specific to target diagrammatic tool. In one example, an exemplary application may be configured to utilize a third-party service to provide a representation of a process flow diagram based on a particular data object.

Operation 432, may further comprise displaying the representation of the process flow diagram. As described above, an exemplary application configured for automated generation of a process flow diagram may comprise a user interface. Operation 432 may cause the user interface to simultaneously display the received input and the generated process flow diagram. For instance, the received input may be displayed in a first pane of the user interface concurrently with the generated process flow diagram being displayed in a second pane of the user interface.

Flow of method 420 may proceed to decision operation 434, where it is determined whether there are any updates to one of more of the received input and the presented process flow diagram. In examples, the exemplary application may be configured to update display of either the received input, the process flow diagram (or both) based on any updates. If an update is detected, flow branches YES and returns to operation 422, where input is received.

If no update occurs, flow branches NO and proceeds to operation 436, where the process flow diagram may be managed. Management (operation 436) of the process flow diagram (and an associated data object) may comprise executing any control operations including but not limited to: saving, deleting, sharing, exporting, and viewing, among other examples. In one example, operation 436 comprises converting a data format of the data object to a format that is readable by a productivity application and sharing the data object for the process flow diagram with the productivity application. In another example, operation 436 may comprise exporting the data object to a productivity application.

FIG. 4C is an exemplary method 440 related to manipulation of a data object used for generation of a process flow diagram with which aspects of the present disclosure may be practiced. As an example, method 440 may be executed by an exemplary processing device and/or system such as those shown in FIGS. 1-3. In examples, method 440 may execute on a device comprising at least one processor configured to store and execute operations, programs or instructions. Operations performed in method 440 may correspond to operations executed by a system and/or service that execute computer programs, application programming interfaces (APIs), neural networks or machine-learning processing, among other examples. As an example, processing operations executed in method 440 may be performed by one or more hardware components. In another example, processing operations executed in method 440 may be performed by one or more software components. In some examples, processing operations described in method 440 may be executed by one or more applications/services associated with a web service that has access to a plurality of application/services, devices, knowledge resources, etc. Processing operations described in method 440 may be implemented by one or more components connected over a distributed network, for example, as described in system 600 (of FIG. 6). Method 440 describes manipulation of a data object by one or more of: an exemplary application configured for automated generation of a process flow diagram and a productivity application. Examples of productivity applications have been previously provided.

Method 440 begins at operation 442, where an exemplary data object for a process flow diagram is accessed. An exemplary data object and access to a data object has been previously described. An exemplary data object may be a data object that is modified by an exemplary application, for example, as previously described in method 420. Examples related to modification of a data object have been previously described. In an example where an exemplary application is accessing a raw data object (e.g. provided by an exemplary natural language processing component), modification of a data object for access by a productivity application occurs in operation 444. In at least one example, an application configured for automated generation of a process flow diagram may be responsible for managing access to a data object for a process flow diagram. In another example, access (operation 442) to the data object may be made by a productivity application that is attempting to generate a process flow diagram from the data object.

Flow may proceed to operation 444, where a file format for the data object may be converted to a format that is readable by the productivity application. In many cases, the format of that data object may not be usable by a particular productivity application to create and display the process flow diagram. In such cases, the exemplary application configured for automated process flow generation may be configured to convert data of the data object and/or a file format of the data object so that the data object is readable by the productivity application to display a process flow diagram. For instance, an exemplary application can create multiple formats of a data object that can be accessed by particular productivity applications. In alternative examples, the exemplary application may share or export a data object that can be converted by a productivity application. Operation 444 may comprise modifying a data object provided by an exemplary natural language processing component to a form that is readable by a particular productivity application.

In examples where the exemplary application converts the file format for the data object, flow may proceed to operation 446, where the converted data object may be shared with a productivity application. In such an example, operation 446 may comprise receiving, by the productivity application, the converted data object. Flow may proceed to operation 448, where the process flow diagram may be displayed within the productivity application.

At decision operation 450, it is determined whether any update occurs to the data object/process flow diagram. If no update occurs, flow branches NO, and method 440 remains idle until further processing is to be executed. If an update occurs, flow branches YES and proceed to operation 452, where the process flow diagram and data object may be modified. A modified data object may be communicated to the exemplary application configured for automated generation of a process flow diagram as well as any other application.

FIGS. 5A and 5B are exemplary processing device views of a user interface of an application configured for automated generation of a process flow diagram with which aspects of the present disclosure may be practiced.

FIG. 5A illustrates processing device view 500 that provides an example of a user interface configured to concurrently display received input and a process flow diagram automatically generated based on the received input. Processing device view 500 comprises an example of a "home" page view in an exemplary application. One skilled in the art should understand that processing device view 500 is just one example of a "home" page view for an exemplary application, where appearance and features offered may vary based on updates to versions of the application. Processing device view 500 comprises a first pane 502 (e.g. left pane) that displays received input. In examples, input may be received into the first pane 502 through text input, handwritten input and spoken utterances. In examples, a process flow diagram may be displayed in a second pane 504, where the displayed process flow diagram is based on received input (e.g. that is displayed in the first pane 502). This may enable a user to easily create a process flow diagram without having to understand how to use complex diagramming tools that may comprise features a user is unfamiliar with. Furthermore, such a display provides real-time update to process flow diagrams based on changes to received input.

Processing device view 500 (e.g. "home" page view) may comprise a number of features that are configured to easily enable creation of a process flow diagram. Features, of a "general flowchart" tab, are shown in processing device view 500 and further described in the foregoing. Another tab "dictate" provides a user with a user interface element that prompts the user to enter spoken input, which may then be converted to text and displayed in the first pane 502.

Another feature tab "reverse engineer" may present user interface elements configured to enable a user to select code, documents, content, existing process map, etc., and automatically generate a process flow representation of such data. Examples described above in method 420, for example, relate to a forward engineering process of generating a process flow diagram, where input is used to create a new process flow diagram. A "reverse engineering" component enables the exemplary application to create a textual representation for an existing process flow diagram, for example, where the textual representation can be used to further edit/modify an existing diagram. Details related to reverse-engineering an existing process flow diagram are now provided.

The exemplary application is configured to enable a user to select an existing process flow diagram, where the application is configured to convert the existing diagram into a textual representation and then make changes to the textual representation to enable a user to edit the existing process flow diagram, for example, by entering input into the user interface of the application. In converting an existing diagram to a textual representation, the exemplary application is configured to identify text, shapes, connections between various components of a process flow diagram and convert the components into a textual representation that can be displayed (e.g. within the application) for a user to edit the existing process flow diagram. A conversion process may comprise creating a new data object (or modifying an existing data object) to break down the existing process flow diagram into strings. In one example, the conversion process Jsonifies the existing process flow diagram to provide JSON strings for all components including but not limited to: position of the shapes, text in the shapes, and connections between the shapes, among other examples. To understand schema of the generated strings, processing operations of an object model may be applied that identifies and matches particular strings, which can be further analyzed to identify elements that can be used to create the textual representation. In examples, an object model may identify a plurality of elements. However, not all elements may be used for textual conversion. In such examples, the object model may be trained to identify the elements necessary for textual conversion.

In examples, the exemplary application may tailor the object model to a specific diagram tool that was used to create the existing process flow diagram. The application may identify a diagramming tool that was used to create the process flow diagram, for example, from a file format of the process flow diagram. This not only increases the extensibility and flexibility of the exemplary application (to interface with a variety of diagramming tools and formats) but also enables the exemplary application to more accurately reverse engineer a process flow diagram into a textual representation, among other examples.

In one example, exemplary processing operations for reverse engineering an existing process flow diagram may comprise but are not limited to:
    de-serializing a data object (e.g. into strings) for object model processing;
    iterating, using the object model, through the strings of the data object;
    verifying if there are branching/go to options;
    verifying if there are conditional statements;
    applying the text found in the navigation of the object model to an array;
    repeating the process until all of the strings of the data object are parsed;
    outputting the text entered in the array in the form of sentences; and
    displaying the textual representation and a visual representation of the corresponding process flow diagram.

In the reverse engineering processing, machine learning operations may not be used as the reverse engineering process involves pure parsing of string schemas to correctly identify the text and an order of the text for an existing process flow diagram. The text generated from the existing process flow diagram can be saved in the text libraries where it is saved a text file which can be used later to regenerate the process flow diagram and/or convert the process flow diagram into different formats for different diagramming tools.

FIG. 5B illustrates processing device view 520 that provides an example of a user interface for managing user-defined grammar rules. As an example, a user my select a "file" tab (shown in processing device view 520) and further select a "rules" option 522. This may present a user interface for management of exemplary user-defined grammar rules as shown in processing device view 520. One skilled in the art should understand that processing device view 520 is just one example of user interface features for an exemplary application, where appearance and features offered may vary based on updates to versions of the application. The "rules" option 522 may be configured to provide a user with an ability to set a new user-defined grammar rule (e.g. where an exemplary grammar rule 524 "user defined grammar rule 1") is being displayed. As an example, grammar rule 524 is a rule that identifies treatment of punctuation (e.g. question mark (?)). When such an input is entered, the natural language processing component can use grammar rule 524 to identify that an intent (of the user) is to have the question mark treated as a decision operation. As another example, a user may create a user-defined grammar rule that can provide indication as to how to process short-hand text, acronyms, abbreviations, etc. When applies, such a user-defined grammar rule may enable a user to enter short-hand text, abbreviations, etc. without needing to fully define terms for the natural language processing component to understand.

Fields of a user interface prompt for defining a grammar rule (e.g. grammar rule 524) may vary and may include fields that a user can custom define. Additionally, application services may interface with the exemplary application during rule creation. For instance, an exemplary intelligent personal assistant service (e.g. Cortana®) may be used to help a user define a grammar rule. For instance, the exemplary intelligent personal assistant service may be utilized to assist with understanding of the users intent and/or context of the received input. Another user interface feature (e.g. "list of user defined grammar rules") may enable a user to view, modify and/or manage user-defined grammar rules that may be applied for processing of received input.

Figure 6:
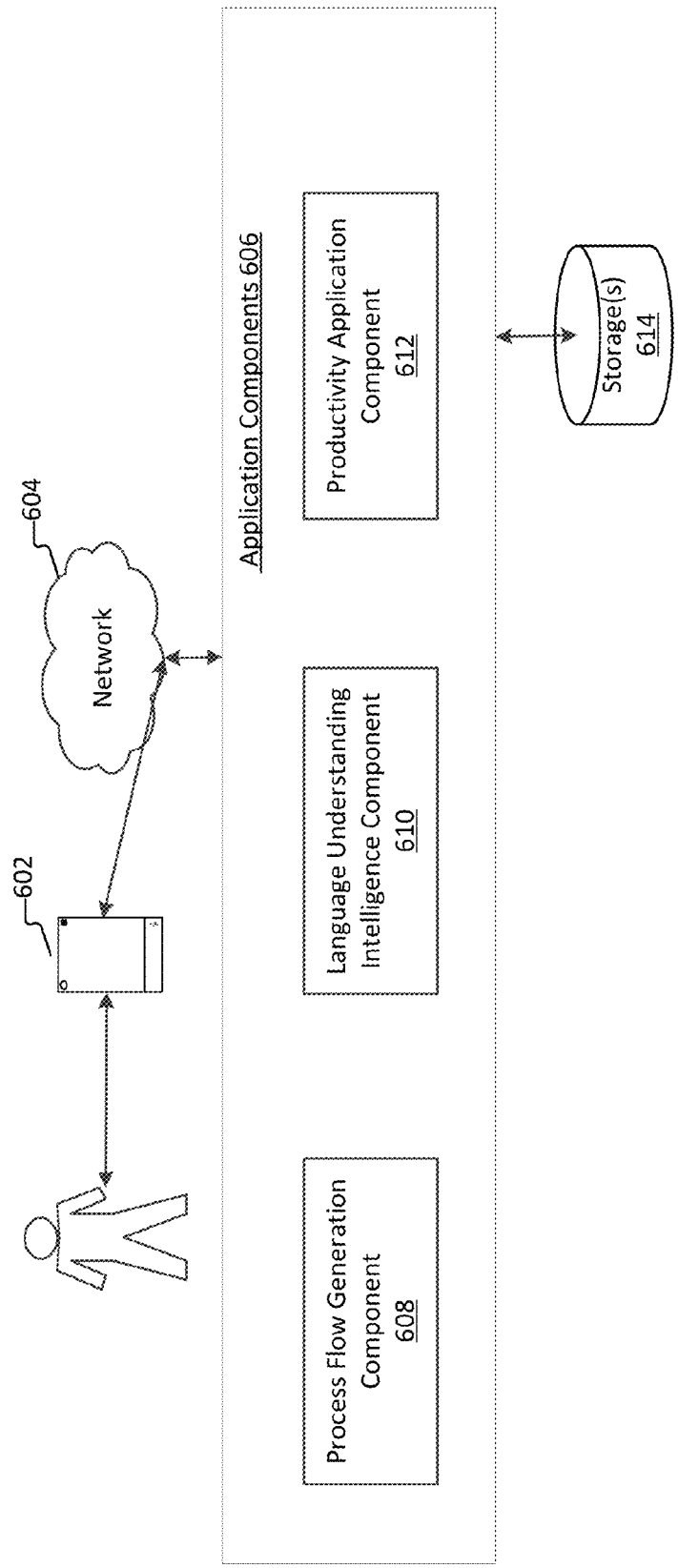
FIG. 6 illustrates an exemplary system implementable on one or more computing devices on which aspects of the present disclosure may be practiced.

FIG. 6 illustrates an exemplary system 600 implementable on one or more computing devices on which aspects of the present disclosure may be practiced. System 600 may be an exemplary system for process flow diagram generation and management. In examples, system 600 may be configured for defining rules that enable an exemplary application for automated generation of a process flow diagram and/or an exemplary language understanding intelligence service to: generate process flow diagrams from received input, generate a data object for a process flow diagram and/or convert a data object for a process flow diagram to a format that is readable by a productivity application, among other examples described herein.

Components of system 600 may be hardware components or software implemented on and/or executed by hardware components. In examples, system 600 may include any of hardware components (e.g., ASIC, other devices used to execute/run an OS, and software components (e.g., applications, application programming interfaces, modules, virtual machines, runtime libraries) running on hardware. In one example, an exemplary system 600 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 1-3. One or more components of system 600 may be configured to execute any of the processing operations described in at least the methods described in FIGS. 4A-4C.

In other examples, the components of systems disclosed herein may be spread across multiple devices. For instance, a first component may be configured to perform natural language processing of a received input and/or generate a data object for conversion of received input to a process flow diagram. A second component may be configured to enable definition of user-defined grammar rules for converting input into a process flow diagram and/or convert a data object to a format that is readable by a productivity application. Additional components may be configured to execute processing operations related to other examples described herein.

In examples, one or more data stores/storages or other memory are associated with system 600. For example, a component of system 600 may have one or more data storage(s) 614 (described below) associated therewith. Data associated with a component of system 600 may be stored thereon as well as processing operations/instructions executed by a component of system 600. Furthermore, it is presented that application components of system 600 may interface with other application services. Application services may be any resource that may extend functionality of one or more components of system 600. Application services may include but are not limited to: web search services, e-mail applications, calendars, device management services, address book services, informational services, etc.), line-of-business (LOB) management services, customer relationship management (CRM) services, debugging services, accounting services, payroll services, and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 600. Exemplary system 600 comprises application components 606 that further comprise: a process flow generation component 608, a language understanding intelligence component 610 and a productivity application component 612, where each of the identified components may comprise one or more additional components.

System 600 may further comprise one or more storage(s) 614 that may store data associated with operation of one or more components of system 600. In examples, storage(s) 614 may interface with other components of system 600. Data associated with any component of system 600 may be stored in storage(s) 614, where components may be connected to storage(s) 614 over a distributed network including cloud computing platforms and infrastructure services. Exemplary storage(s) 614 may be any of a first-party source, a second-party source, and a third-party source. Storage(s) 614 are any physical or virtual memory space. Storage(s) 614 may store any data for processing operations performed by components of system 600, retained data from processing operations, stored programs, code or application programming interfaces (APIs), training data, links to resources internal and external to system 600 and knowledge data among other examples. Furthermore, in examples, components of system 600 may utilize knowledge data in processing by components of system 600. Knowledge may be used by one or more components of system 600 to improve processing of any of the application components 606 where knowledge data can be obtained from resources internal or external to system 600. In examples, knowledge data may be maintained in storage(s) 614 or retrieved from one or more resources external to system 600 by knowledge fetch operation. In examples (as described below) storage(s) 614 may store exemplary data programs/services and other types of data for: providing access to knowledge data across a plurality of application services, receiving input, converting spoken input/utterances into text, interfacing with an exemplary language understanding intelligence service, accessing a natural language processing component (e.g. of a language understanding intelligence service), training related to recognition of input for conversion to process flow steps, rules for generating process flow diagrams including user defined rules that can be utilized by a natural language processing component, process flow diagram generation, generating a data object for process flow generation, and converting the data object to a format that is readable by any of a plurality of productivity applications, among other examples.

In FIG. 6, processing device 602 may be any device comprising at least one processor and at least one memory/storage. Examples of processing device 602 may include but are not limited to: processing devices such as desktop computers, servers, phones, tablets, phablets, slates, laptops, watches, and any other collection of electrical components such as devices having one or more processors or circuits. In one example processing device 602 may be a device of a user that is executing applications/services. In examples, processing device 602 may communicate with the application components 606 via a network 604. In one aspect, network 404 is a distributed computing network, such as the Internet. Application services may communicate with application components 606 via the network 604. Processing device 602 may be a device as described in the description of FIGS. 1-3. In some examples, processing device 602 may comprise multiple connected devices. Processing device 602 is an example of a user computing device.

The processing device 602 may execute processing operations that include accessing an application that comprises a user interface for generating a process flow diagram from received input such as textual input or voice to text input, among other examples. In one such instance, an exemplary application may be configured to enable users/administrators to generate and customize rules that may be accessed and utilized by a natural language processing component, for example, that may be included in an exemplary language understanding intelligence service. In further examples, processing device 602 may be utilized to access a language understanding intelligence service, for example, that may provide natural language processing for received input via a web service. In one example, an exemplary language understanding intelligence service may interface with an application/user interface through a distributed network connection (e.g. cloud-based resource may be accessed by an exemplary application). In alternative examples, an exemplary language understanding intelligence service may be configured within an exemplary application/user interface for process flow diagramming. In one such instance, updates may be periodically provided from the language understanding intelligence service, for example, via a network connection. In other examples, processing device 602 may be configured to reformat a version of an exemplary data object to enable display of a process flow diagram within a specific productivity application. Examples of productivity applications have been previously provided.

Processing device 602 may be further connected with storage(s) 614 via a distributed network. One or more tenant resources (e.g. Tenant Resource A, Tenant Resource B, Tenant Resource C, etc.) may be associated with processing device 602. A tenant resource may be a user account associated with a processing device and/or distributed network service. Data associated with a tenant resource may be stored on storage(s) 614, where a tenant account can be utilized to access stored data by processing device 602 and/or other processing devices.

The application components 606 are a collection of components configured for process flow diagram generation and management. Application components 606 may comprise: a process flow generation component 608, a language understanding intelligence component 610 and a productivity application component 612, where each of the identified components may comprise one or more additional components.

The process flow generation component 608 is a component that implements processing operations described in the descriptions in at least the methods of FIGS. 4A-4C described above. The process flow is also configured to execute reverse engineering processing of an existing process flow diagram, for example, as described in the description of processing device view 500 (of FIG. 5A). The process flow generation component 608 may be configured to enable a user to define rules (e.g. user defined grammar rules that enable a natural language processing component (e.g. of an exemplary language understanding intelligence service) to process received input for generation of a data object that can be used to create a process flow diagram. In doing so, the process flow generation component 608 may be configured to provide an application that comprises an exemplary user interface that enables users to create user-defined grammar rules and generate process flow diagrams based on received input. The process flow generation component 608 may interface with other application components 606 such as the language understanding intelligence component 610 to apply natural language processing to generate the process flow diagram. The process flow generation component 608 may also interface with a productivity application component 612 to provide an exemplary data object for access to generated process flow diagram.

The language understanding intelligence component 610 is a component that implements processing operations described in the descriptions in at least the methods of FIGS. 4A-4C described above. The language understanding intelligence component 610 may be configured to interface with the process flow generation component 608 to provide natural language processing capabilities for processing received input and converting the received input into a process flow diagram. In examples, the language understanding intelligence component 610 may be incorporated within an exemplary application for process flow generation, for example, provided through the process flow generation component 608. In alternative examples, the language understanding intelligence component 610 may interface with the process flow generation component 608 over a distributed network. The language understanding intelligence component 610 may also interface with a productivity application component 612, for example, to provide support for creating, accessing or converting a data object to assist in automated generation of a process flow diagram from received input.

The productivity application component 612 is a component that implements processing operations described in the descriptions in at least the methods of FIGS. 4A-4C described above. The productivity application component 612 may be configured to interface with the process flow generation component 608, for example, to enable a productivity application to access and display a generated process flow diagram. In examples, the productivity application component 612 may access an exemplary data object (e.g. language-independent data object) and convert a format of the data object to a format that is readable by a particular productivity application. In that way, the productivity application component 612 is configured to enable a particular productivity application to display and edit a generated process flow diagram. The productivity application component 612 may be configured to convert a data object into any format and thus can enable a process flow diagram to be accessed in any of a number of different productivity applications. In alternative examples, an application associated with the process flow generation component 608 may convert a data object for process flow generation to a format that is readable by an application of the productivity application component 612. In such an example, the productivity application component 612 may receive a shared or exported data object/file to display a process flow diagram.

In some examples, an exemplary productivity application may be a web service application that is accessed over a network connection. The productivity application component 612 may be configured to interface with other application components 606 such as the process flow generation component 608 and the language understanding intelligence component 610 to enable a productivity application to access a generated process flow diagram. In some cases, a productivity application may be updated and require a data object to be converted into a different format. The productivity application component 612 may be configured to synchronize with other application components 606 to enable a process flow diagram to be accessible.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
receiving an input through an application configured for automated generation of a process flow diagram;
providing the received input to a natural language processing component of a language understanding intelligence service;
accessing a data object, received from the natural language processing component, that provides data for creation of a process flow diagram based on the received input, wherein the data object is generated based on natural language processing by the natural language processing component and at least one user defined grammar rule, provided by the application, for converting the received input to one or more process flow steps; and
presenting the process flow diagram within the application.

2. The method of claim 1, further comprising:
receiving, through the application configured for automated generation of a process flow diagram, a request to create the at least one user defined grammar rule; and
generating the at least one user defined grammar rule.

3. The method of claim 2, further comprising providing the at least one user defined grammar rule to the natural language processing component for the natural language processing.

4. The method of claim 3, further comprising analyzing, by the natural language component, the received input, wherein the analyzing further comprises:
parsing text of the received input;
evaluating the text of the received input using a language understanding model that contemplates the at least one user defined grammar rule;
generating the data object from an evaluation of the text; and
providing the data object to the application, wherein the process flow diagram is presented based on access to the data object.

5. The method of claim 1, further comprising modifying the data object, received from the natural language processing component, to a format that enables the application to present a visual representation of the process flow diagram, and wherein the presenting utilizes the modified data object to present the process flow diagram.

6. The method of claim 1, further comprising: converting a data format of the data object to a format that is readable by a productivity application; and sharing the data object for the process flow diagram with the productivity application.

7. The method of claim 1, wherein the application configured for automated generation of a process flow diagram comprises a user interface, and wherein the user interface simultaneously displays: in a first pane of the user interface, the received input and in a second pane of the user interface, the process flow diagram.

8. A system comprising:
at least one processor; and
a memory operatively connected with the at least one processor storing computer-executable instructions that, when executed by the at least one processor, causes the at least one processor to execute a method that comprises:
receiving an input through an application configured for automated generation of a process flow diagram,
providing the received input to a natural language processing component of a language understanding intelligence service,
accessing a data object, received from the natural language processing component, that provides data for creation of a process flow diagram based on the received input, wherein the data object is generated based on natural language processing by the natural language processing component and at least one user defined grammar rule, provided by the application, for converting the received input to one or more process flow steps, and presenting the process flow diagram within the application.

9. The system of claim 8, wherein the executed method further comprises: receiving, through the application configured for automated generation of a process flow diagram, a request to create the at least one user defined grammar rule; and generating the at least one user defined grammar rule.

10. The system of claim 9, wherein the executed method further comprises: providing the at least one user defined grammar rule to the natural language processing component for the natural language processing.

11. The system of claim 10, wherein the executed method further comprises: analyzing, by the natural language component, the received input, wherein the analyzing further comprises:
   parsing text of the received input,
   evaluating the text of the received input using a language understanding model that contemplates the at least one user defined grammar rule,
   generating the data object from an evaluation of the text, and
   providing the data object to the application, wherein the process flow diagram is presented based on access to the data object.

12. The system of claim 8, further comprising modifying the data object, received from the natural language processing component, to a format that enables the application to present a visual representation of the process flow diagram, and wherein the presenting utilizes the modified data object to present the process flow diagram.

13. The system of claim 8, wherein the executed method further comprises: converting a data format of the data object to a format that is readable by a productivity application and sharing the data object for the process flow diagram with the productivity application.

14. The system of claim 8, wherein the application configured for automated generation of a process flow diagram comprises a user interface, and wherein the user interface simultaneously displays: in a first pane of the user interface, the received input and in a second pane of the user interface, the process flow diagram.

15. A computer-readable storage device including computer-executable instructions that, when executed by at least one processor, causes the at least one processor to execute a method comprising:

receiving an input through an application configured for automated generation of a process flow diagram;

providing the received input to a natural language processing component of a language understanding intelligence service;

accessing a data object, received from the natural language processing component, that provides data for creation of a process flow diagram based on the received input, wherein the data object is generated based on natural language processing by the natural language processing component and at least one user defined grammar rule, provided by the application, for converting the received input to one or more process flow steps; and presenting the process flow diagram within the application.

16. The computer-readable storage device of claim 15, wherein the executed method further comprising: receiving, through the application configured for automated generation of a process flow diagram, a request to create the at least one user defined grammar rule; and generating the at least one user defined grammar rule.

17. The computer-readable storage device of claim 16, wherein the executed method further comprising: providing the at least one user defined grammar rule to the natural language processing component for the natural language processing, and wherein the process flow diagram is generated based on a result received from the natural language processing component.

18. The computer-readable storage device of claim 15, wherein the executed method further comprising: modifying the data object, received from the natural language processing component, to a format that enables the application to present a visual representation of the process flow diagram, and wherein the presenting utilizes the modified data object to present the process flow diagram.

19. The computer-readable storage device of claim 15, wherein the executed method further comprising: converting a data format of the data object to a format that is readable by a productivity application; and sharing the data object for the process flow diagram with the productivity application.

20. The computer-readable storage device of claim 15, wherein the application configured for automated generation of a process flow diagram comprises a user interface, and wherein the user interface simultaneously displays: in a first pane of the user interface, the received input and in a second pane of the user interface, the process flow diagram.

* * * * *